United States Patent
Breach et al.

(10) Patent No.: US 6,668,335 B1
(45) Date of Patent: Dec. 23, 2003

(54) SYSTEM FOR RECOVERING DATA IN A MULTIPROCESSOR SYSTEM COMPRISING A CONDUCTION PATH FOR EACH BIT BETWEEN PROCESSORS WHERE THE PATHS ARE GROUPED INTO SEPARATE BUNDLES AND ROUTED ALONG DIFFERENT PATHS

(75) Inventors: Scott E. Breach, Sunnyvale, CA (US); John Eble, Worcester, MA (US); Arvind Kumar, Boston, MA (US); Richard E. Kessler, Shrewsbury, MA (US); Darrel Donaldson, Lancaster, MA (US); David W. Hartwell, Bolton, MA (US)

(73) Assignee: Hewlett-Packard Company, L.P., Houston, TX (US)

( * ) Notice: Subject to any disclaimer, the term of this patent is extended or adjusted under 35 U.S.C. 154(b) by 672 days.

(21) Appl. No.: 09/653,643

(22) Filed: Aug. 31, 2000

(51) Int. Cl.$^7$ .......................... G06F 1/04; G06F 15/173; G06F 17/50
(52) U.S. Cl. .......................... 713/600; 709/237; 716/13
(58) Field of Search .......................... 713/600; 709/237, 709/313; 716/8, 11, 12, 15, 16

(56) References Cited

U.S. PATENT DOCUMENTS

| | | | |
|---|---|---|---|
| 5,261,066 A | 11/1993 | Jouppi et al. ............... | 395/425 |
| 5,317,718 A | 5/1994 | Jouppi ........................ | 395/425 |
| 5,459,836 A * | 10/1995 | Whittaker et al. .......... | 709/313 |
| 5,758,183 A | 5/1998 | Scales ........................ | 395/825 |
| 5,761,729 A | 6/1998 | Scales ........................ | 711/148 |
| 5,787,480 A | 7/1998 | Scales et al. ............... | 711/148 |
| 5,802,585 A | 9/1998 | Scales et al. ............... | 711/154 |
| 5,809,450 A | 9/1998 | Chrysos et al. ............. | 702/186 |
| 5,841,988 A * | 11/1998 | Chennubhotla et al. ..... | 709/237 |
| 5,875,151 A | 2/1999 | Mick .......................... | 365/233 |
| 5,890,201 A | 3/1999 | McLellan et al. ........... | 711/108 |
| 5,893,931 A | 4/1999 | Peng et al. .................. | 711/206 |
| 5,918,250 A | 6/1999 | Hammond ................... | 711/205 |
| 5,918,251 A | 6/1999 | Yamada et al. .............. | 711/207 |
| 5,923,872 A | 7/1999 | Chrysos et al. ............. | 395/591 |
| 5,950,228 A | 9/1999 | Scales et al. ............... | 711/148 |
| 5,964,867 A | 10/1999 | Anderson et al. ........... | 712/219 |
| 5,983,325 A | 11/1999 | Lewchuk ..................... | 711/137 |
| 6,000,044 A | 12/1999 | Chrysos et al. ............. | 714/47 |
| 6,070,227 A | 5/2000 | Rokicki ....................... | 711/117 |
| 6,085,300 A | 7/2000 | Sunaga et al. .............. | 711/168 |
| 6,119,263 A * | 9/2000 | Mowbray et al. ........... | 714/781 |
| 6,327,697 B1 * | 12/2001 | Ghosh ......................... | 716/13 |

FOREIGN PATENT DOCUMENTS

JP 03270431 A * 12/1991 ........... H04L/12/40

OTHER PUBLICATIONS

IBM, Interprocessor Communications Architecture, Jul. 1, 1992, Vol 35, Issue 2, p. No. 188.*
*Alpha Architecture Reference Manual*, Third Edition, The Alpha Architecture Committee, 1998 Digital Equipment Corporation (21 p.), in particular pp. 3–1 through 3–15.

(List continued on next page.)

Primary Examiner—Dennis M. Butler
Assistant Examiner—Suresh K Suryawanshi

(57) ABSTRACT

A system comprising a communications link between processors configured to transmit packets between transmitting and receiving processors. The communications link comprises a conduction path for each bit in the packet and the paths are grouped into separate bundles and routed along different paths. A forwarded clock signal is sent with each bundle. The processors operate with a clock frequency that is roughly three times as fast as the clock frequency of the forwarded clock signal. Data is transmitted on both rising and falling edges of the clock. The receiving processor comprises a recovery circuit to which it pulls the asynchronous data into the processor clock domain. The recovery circuit comprises a delay locked loop circuit configured to create a delayed copy of the clock signal with clock edges that are aligned with the center of the data window for the transmitted data.

20 Claims, 7 Drawing Sheets-

OTHER PUBLICATIONS

*A Logic Design Structure For LSI Testability*, E. B. Eichelberger et al., 1977 IEEE (pp. 462–468).

*Direct RDRAM ™256/288–Mbit (512Kx16/18x32s)*, Preliminary Information Document DL0060 Version 1.01 (69 p.).

*Testability Features of AMD–K6 ™Microprocessor*, R. S. Fetherston et al., Advanced Micro Devices (8 p.).

*Hardware Fault Containment in Scalable Shared–Memory Multiprocessors*, D. Teodosiu et al., Computer Systems Laboratory, Stanford University (12 p.), 1977.

*Cellular Disco: resource management using virtual clusters on shared–memory multiprocessors*, K. Govil et al., 1999 ACM 1–58113–140–2/99/0012 (16 p.).

*Are Your PLDs Metastable!*, Cypress Semiconductor Corporation, Mar. 6, 1997 (19 p.).

*Rambus® RIMM ™Module (with 128/144Mb RDRAMs)*, Preliminary Information, Document DL0084 Version 1.1 (12 p.).

*Direct Rambus ™RIMM ™Module Specification Version 1.0*, Rambus Inc., SL–0006–100 (32 p.), 2000.

*End–To–End Fault Containment In Scalable Shared–Memory Multiprocessors*, D. Teodosiu, Jul. 2000 (148 p.).

* cited by examiner

SYSTEM FOR RECOVERING DATA IN A MULTIPROCESSOR SYSTEM COMPRISING A CONDUCTION PATH FOR EACH BIT BETWEEN PROCESSORS WHERE THE PATHS ARE GROUPED INTO SEPARATE BUNDLES AND ROUTED ALONG DIFFERENT PATHS

CROSS-REFERENCE TO RELATED APPLICATIONS

This application relates to the following commonly assigned co-pending applications entitled:

"Apparatus And Method For Interfacing A High Speed Scan-Path With Slow-Speed Test Equipment," Ser. No. 09/653,642, filed Aug. 31, 2000, "Rotary Rule And Coherence Dependence Priority Rule," Ser. No. 09/652,232, filed Aug. 31, 2000, "Speculative Scalable Directory Based Cache Coherence Protocol," Ser. No. 09/652,703, filed Aug. 31, 2000, "Scalable Efficient I/O Port Protocol," Ser. No. 09/652,391, filed Aug. 31, 2000, "Efficient Translation Lookaside Buffer Miss Processing In Computer Systems With A Large Range Of Page Sizes," Ser. No. 09/652,552, filed Aug. 31, 2000, "Fault Containment And Error Recovery Techniques In A Scalable Multiprocessor," Ser. No. 09/651,949, filed Aug. 31, 2000, "Speculative Directory Writes In A Directory Based Cache Coherent Nonuniform Memory Access Protocol," Ser. No. 09/652,834, filed Aug. 31, 2000, "Special Encoding Of Known Bad Data," Ser. No. 09/652,314, filed Aug. 31, 2000, "Broadcast Invalidate Scheme," Ser. No. 09/652,165, filed Aug. 31, 2000, "Mechanism To Keep All Open Pages In A DRAM Memory System," Ser. No. 09/652,704, filed Aug. 31, 2000, "Programmable DRAM Address Mapping Mechanism," Ser. No. 09/653,093, filed Aug. 31, 2000, "Computer Architecture And System For Efficient Management Of Bi-Directional Bus," Ser. No. 09/653,093, filed Aug. 31, 2000, "An Efficient Address Interleaving With Simultaneous Multiple Locality Options," Ser. No. 09/651,948, filed Aug. 31, 2000, "A High Performance Way Allocation Strategy For A Multi-Way Associative Cache System," Ser. No. 09/653,092, filed Aug. 31, 2000, "Method And System For Absorbing Defects In High Performance Microprocessor With A Large N-Way Set Associative Cache," Ser. No. 09/651,948, filed Aug. 31, 2000, "A Method For Reducing Directory Writes And Latency In A High Performance, Directory-Based, Coherency Protocol," Ser. No. 09/653,094, filed Aug. 31, 2000, "Mechanism To Reorder Memory Read And Write Transactions For Reduced Latency And Increased Bandwidth," Ser. No. 09/653,094, filed Aug. 31, 2000, "System For Minimizing Memory Bank Conflicts In A Computer System," Ser. No. 09/652,325, filed Aug. 31, 2000, "Computer Resource Management And Allocation System," Ser. No. 09/651,945, filed Aug. 31, 2000, "Fast Lane Prefetching," Ser. No. 09/652,451, filed Aug. 31, 2000, "Mechanism For Synchronizing Multiple Skewed Source-Synchronous Data Channels With Automatic Initialization Feature," Ser. No. 09/652,480, filed Aug. 31, 2000, "Mechanism To Control The Allocation Of An N-Source Shared Buffer," Ser. No. 09/651,924, filed Aug. 31, 2000, and "Chaining Directory Reads And Writes To Reduce DRAM Bandwidth In A Directory Based CC-NUMA Protocol," Ser. No. 09/652,315, filed Aug. 31, 2000, all of which are incorporated by reference herein.

STATEMENT REGARDING FEDERALLY SPONSORED RESEARCH OR DEVELOPMENT

Not applicable.

BACKGROUND OF THE INVENTION

1. Field of the Invention

The present invention generally relates to a computer system comprising a plurality of pipelined, superscalar microprocessors. More particularly, the invention relates to communication of data between multiple processors. More particularly still, the invention relates to the recovery of data transmitted in an asynchronous clock domain along different point to point data paths between processors.

2. Background of the Invention

It often is desirable to include multiple processors in a single computer system. This is especially true for computationally intensive applications and applications that otherwise can benefit from having more than one processor simultaneously performing various tasks. It is not uncommon for a multi-processor system to have 2 or 4 or more processors working in concert with one another. Typically, each processor couples to at least one and perhaps three or four other processors.

Such systems usually require data and commands (e.g., read requests, write requests, etc.) to be transmitted from one processor to another. As processor and bandwidth capabilities increase, the size of the data and command packets also increase. In transmitting this information between processors, it may be desirable to deliver these data packets in contiguous form. That is, the data is preferably transmitted in parallel between respective processors. To accomplish this, signal paths between the processors must exist for each bit of information in a packet. A 32-bit long packet therefore would require 32 separate signal paths between processors.

Routing of multiple, parallel signal paths is difficult in congested printed wiring board configurations. As more components are added to circuit boards, little room is left for signal traces, especially multiple traces that are preferably parallel and of equal length. These routing difficulties exist even in multi-layer board designs. It may be difficult to guarantee that individual bits in a data packet sent at the same time from one processor will arrive at their destination at the same time because signal trace lengths are rarely equal in length. In an extreme case, it may be desirable to intentionally divide the signal paths for a single packet into multiple branches since routing of smaller sub-branches may be easier than routing all the signal paths together. For instance, the 32-bit packet discussed above may be split into two 16-bit packets. Splitting data in this manner makes trace routing less troublesome, but raises issues of signal integrity because the separated signals must be recombined at the destination to form the original data packets. One way to help ensure the data is captured correctly is to send a clock signal with each branch of the data packet. The clock signals may be used to locate data transitions and to account for differences in path lengths between the branches of the data packet. The clock signal may be sampled at the receiver to locate clock edges and correctly extract the data. A mechanism must be created to receive data from these two 16-bit branches and recombine the data into its original, 32-bit form.

The above problem is exacerbated if the data is transmitted at a clock frequency that is different from the processor's internal clock frequency. The receiver must not only recombine the data that has been split among different transmission paths, it must also read and hold the data until the processor is ready to pull the data into the internal clock domain. A number of problems may arise in accomplishing these steps. First, there is no guarantee that data that was aligned as it left the transmitting processor is aligned when it arrives at the receiving processor. Second, if a clock signal is sent with each transmission path, there is no guarantee that the receiving processor will obtain the same result from sampling the separate clocks. For example, in the example given above where the 32-bit packet is divided into two separate paths, the clock signals from each 16-bit group may be sampled at exactly the same time, but because of skew, different results may be obtained. Even if one could guarantee that the data in the two separate branches of the packet arrive at exactly the same time, the clock signal for one branch may be sampled before a clock edge while the other may be sampled after a clock edge. The end result may be incorrectly combined data. Thirdly, because of the asynchronous nature of the transmitted signals, it is highly likely that in waiting to pull captured data into the processor's clock domain, the captured data may be overwritten by incoming data. While buffers may be used to solve these timing and skew problems, unwanted latency delays may be induced.

It is desirable therefore, to develop a data capture scheme that successfully reconstructs and re-synchronizes data at a receiving processor. The capture scheme preferably offers reliable data transfer between processors while minimizing latency and maximizing bandwidth. The capture scheme may also indirectly improve the manufacturability of printed wiring boards and processor hardware by easing the requirements for parallel, equal-length data paths.

BRIEF SUMMARY OF THE INVENTION

The problems noted above are solved in large part by an input data recovery scheme that may be implemented in a multiprocessor system comprising a communications link configured to transmit data packets from a transmitting processor to a receiving processor. The communications link includes a conduction path for each data bit in the data packet. The conduction paths are grouped into separate bundles and routed along different paths and a forwarded clock signal is sent with each bundle. The forwarded clock signal is transmitted on a differential pair of conduction paths. At the receiving processor, the data in the separate bundles is recombined to recreate the original data packet. The processors operate with a clock frequency that is at least three times as fast as the clock frequency of the forwarded clock signal and data is transmitted on both rising and falling edges of the forwarded clock signal.

The receiving processor contains a recovery circuit which samples the forwarded clock signals to locate corresponding clock edges in the separate forwarded clock signals to indicate when the data on the conduction paths may pulled into the processor clock domain. The recovery circuit includes a delay locked loop ("DLL") circuit, a sampling circuit, a finite state machine, and data capture logic. A DLL circuit is coupled to each forwarded clock signal to create a delayed copy of the forwarded clock signal. The clock signal is delayed so that the clock edges in the delayed clock signal are aligned with the center of the data window for data transmitted with the forwarded clock signal.

The recovery circuit also includes a sampling circuit configured to sample the delayed clock signal at the processor clock frequency to locate rising and falling edges in the delayed clock signal. The sampling circuit comprises a chain of flip-flops configured to sample the delayed clock signal and generate a string of sequential samples of the clock signal. The sampling circuit also includes a bank of logic gates configured to set a bit at the output of one of the logic gates indicating that an edge transition occurs between any two of the three sequential samples. Shift registers are coupled to each logic gate and are configured to shift the output of the associated logic gate at every processor clock cycle. A multiplexer is coupled to each shift register and is configured to extract data from a bit location in the shift register as specified by a clock ratio input. This clock ratio is based on the ratio of the transmission and processor clock frequencies and also on the length of the flip-flop chain through which the clock signals are sampled. This information is used to take advantage of the periodic nature of the forwarded clock signal and allows the current data packet to be extracted using a clock edge in the past. This eliminates the need for buffering and unwanted latency that may occur in allowing for worst case skew conditions between the separate data bundles.

The recovery circuit also includes a finite state machine coupled to each sampling circuit. The state machine identifies when corresponding rising or falling edges have been sampled for each delayed clock signal. The finite state machine comprises input logic that is coupled to the outputs of each sampling circuit. This input logic is configured to indicate if the sampling circuit has detected a rising edge, a falling edge, or no edge in the delayed clock signal. The state machine uses information from the input logic in transitioning between a plurality of states. Each state is reserved for a condition where edges of a certain type and from a certain source are expected. The state machine also includes output logic that is configured to receive signals from the input logic and from the state machine. Transitions between states in the state machine occur when expected edge types are found and generate a pulse that is sent to the output logic. If the signals to the output logic are sufficient to indicate that expected rising edges have been found from all delayed clocks, a rise command is output. Conversely, if the signals to the output logic are sufficient to indicate that expected falling edges have been found from all delayed clocks, a fall command is output.

Lastly, the recovery circuit includes data capture logic configured to sample and hold the data bits on each conduction path in the communications link. When the finite state machine issues a command indicating that all falling or rising edges have been found, the data capture logic delivers the data as a complete packet to the processor clock domain at the subsequent processor clock edge. The data capture logic comprises rising and falling capture latches operating at the delayed clock frequency. These latches sample data from each conduction path on rising and falling edges of the delayed clock signal, respectively. The data capture logic also includes a multiplexer configured to select between the output of the rising and falling capture latches. Selection logic is used to detect the rise and fall commands from the finite state machine. When the finite state machine issues a rise command, the selection logic delivers a signal to the multiplexer to select data that is sampled by the rising capture latch. Conversely, when the finite state machine issues a fall command, the selection logic delivers a signal to the multiplexer to select data that is sampled by the falling capture latch. The output of the multiplexers is delivered to a recovery latch operating at the processor clock frequency. The recover latches are enabled only when a rise or a fall command is issued by the finite state machine. Once enabled by the rise or fall commands from the finite state machine, the recovery latches pull the data from the multiplexers into the processor clock domain at the next appropriate clock cycle. In this manner, the original data packet is successfully transmitted across the data communications link and synchronized into the appropriate clock domain.

DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

The term "latch" and "flip-flop", particularly a D flip-flop, are synonymous and refer to a logic device that samples an incoming digital signal and outputs the value of the input bit at a clock edge.

DETAILED DESCRIPTION OF THE PREFERRED EMBODIMENTS

Figure 1:
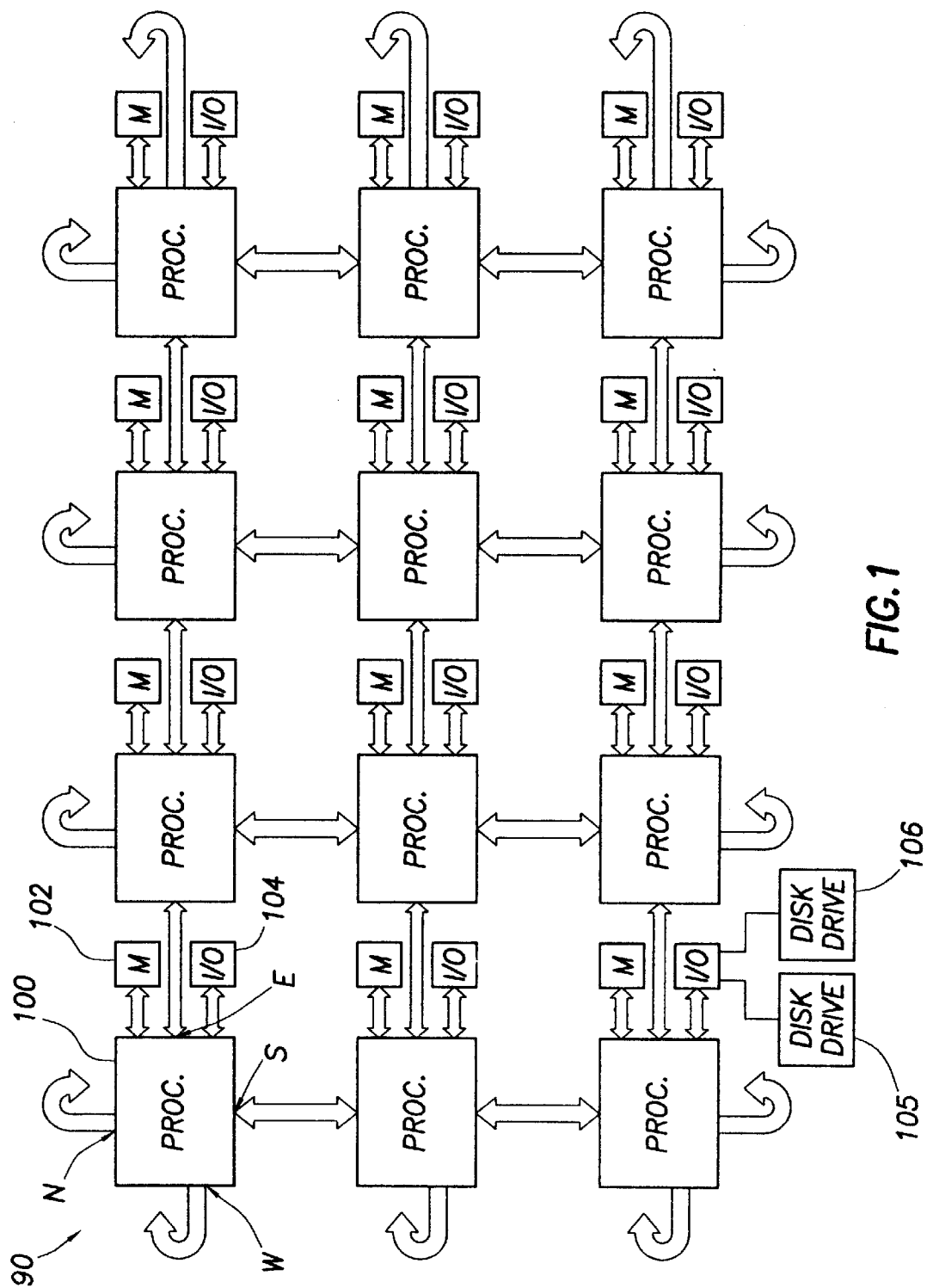
FIG. 1 shows a system diagram of a plurality of microprocessors coupled together.

Referring now to FIG. 1, in accordance with the preferred embodiment of the invention, computer system 90 comprises one or more processors 100 coupled to a memory 102 and an input/output ("I/O") controller 104. As shown, computer system 90 includes 12 processors 100, each processor coupled to a memory and an I/O controller. Each processor preferably includes four ports for connection to adjacent processors. The inter-processor ports are designated "north," "south," "east," and "west" in accordance with the well-known Manhattan grid architecture. As such, each processor 100 can be connected to four other processors. The processors on both ends of the system layout wrap around and connect to processors on the opposite side to implement a 2D torus-type connection. Although 12 processors 100 are shown in the exemplary embodiment of FIG. 1, any desired number of processors (e.g., 256) can be included.

The I/O controller 104 provides an interface to various input/output devices such as disk drives 105 and 106 as shown. Data from the I/O devices thus enters the 2D torus via the I/O controllers.

In accordance with the preferred embodiment, the memory 102 preferably comprises RAMbus™ memory devices, but other types of memory devices can be used if desired. The capacity of the memory devices 102 can be any suitable size. Further, memory devices 102 preferably are implemented as RAMbus Interface Memory Modules ("RIMMS").

In general, computer system 90 can be configured so that any processor 100 can access its own memory 102 and I/O devices as well as the memory and I/O devices of all other processors in the network. Preferably, the computer system may have physical connections between each processor resulting in low interprocessor communication times and improved memory and I/O device access reliability. If physical connections are not present between each pair of processors, a pass-through or bypass path is preferably implemented in each processor that permits accesses to a processor's memory and I/O devices by another processor through one or more pass-through processors.

Figure 2:
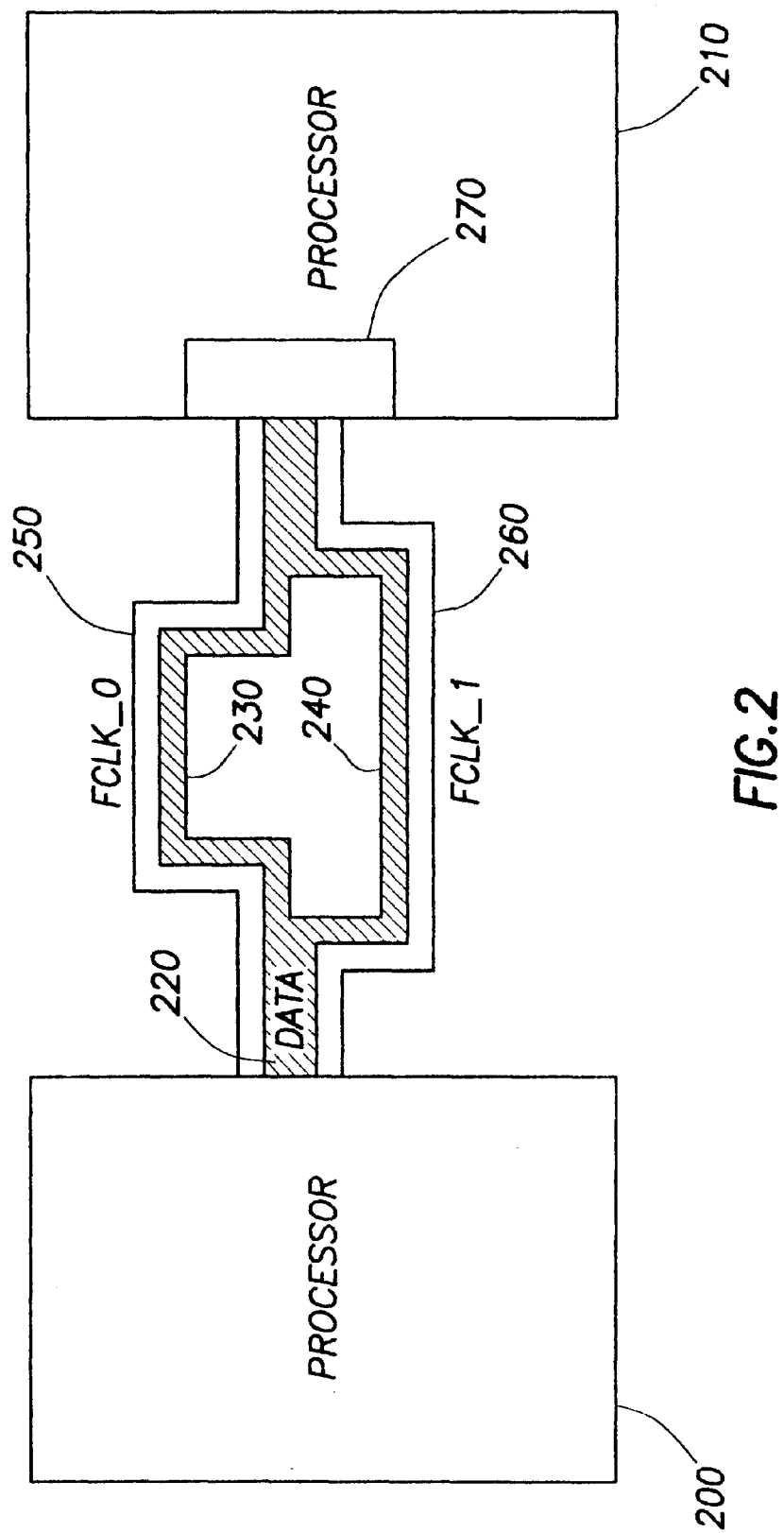
FIGS. 2 shows a diagram of a communication link between two processors configured to transmit data sub-packets, each with its own clock signal.

Referring now to FIG. 2, processors 200 and 210 are preferably connected by a unidirectional, point-to-point link 220, with one processor 200 transmitting data and the other processor 210 receiving data. Links preferably exist for data transmission in both directions, but only one transmission direction is shown in FIG. 2 for clarity. The data link 220 has been separated into two bundles 230, 240, each having its own clock 250, 260. The receiving processor 210 preferably includes a data recovery circuit 270 configured to sample the transmission clocks 250, 260 and extract and recombine the data from each bundle 230, 240 and hold the data for sampling into the processor's internal clock domain.

Figure 3:
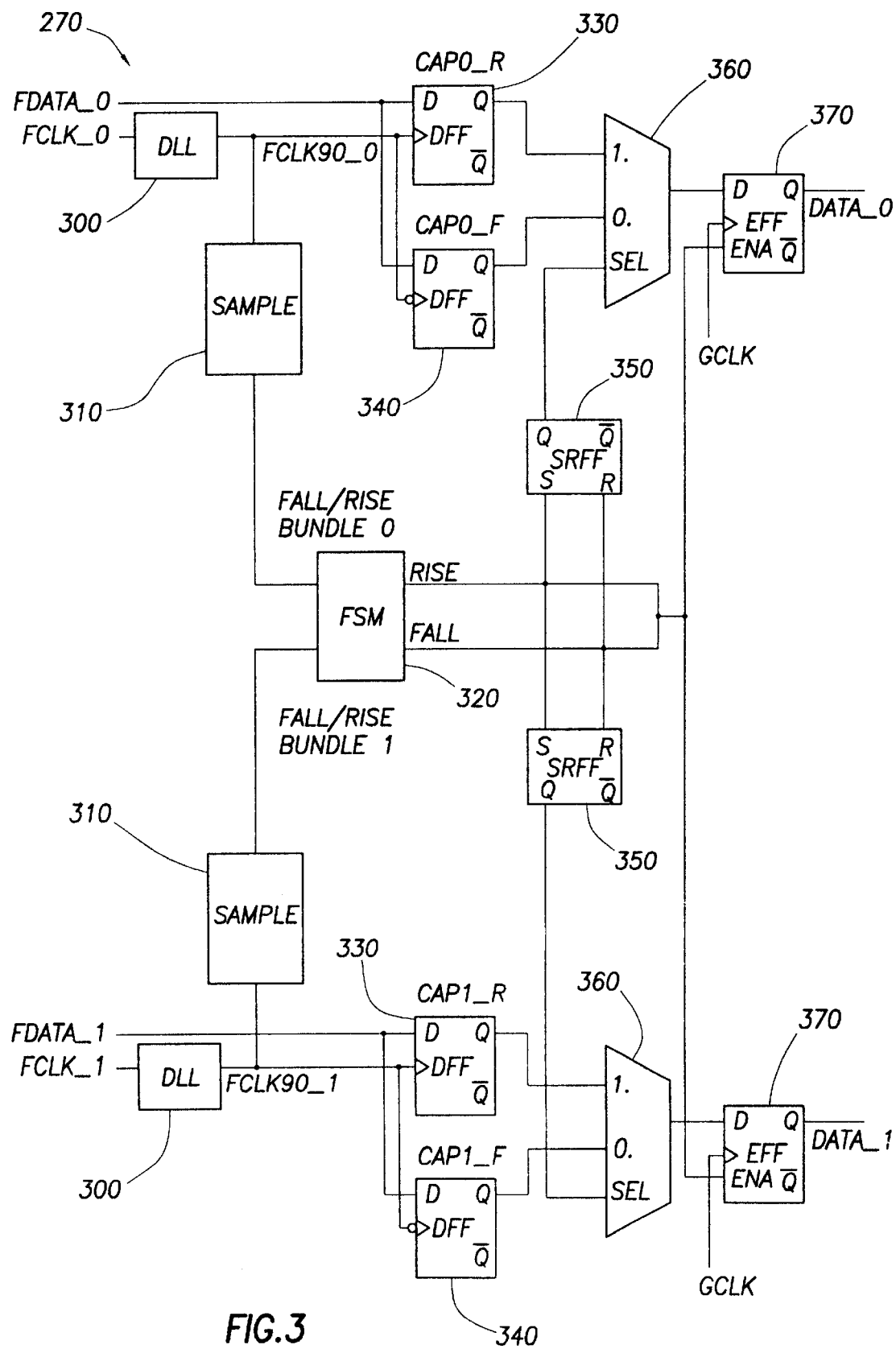
FIG. 3 shows a schematic representation of the preferred embodiment of the data recovery mechanism.

An example of a preferred embodiment of the recovery circuit 270 is shown in FIG. 3. In this schematic, a packet consisting of two data bits (FDATA_0 and FDATA_1) has been routed along different signal paths and must be recovered at the receiving processor. Recovery involves alignment and synchronization. The data bits must be aligned on a clock edge as they were sent so that a data packet can be reconstructed. Furthermore, the data bits must be synchronized with the receiving processors clock frequency, which may be different than the transmission clock frequency. In the preferred embodiment, the processor clock frequency must be at least three times the clock frequency used for data transport. This constraint allows for reliable sampling of the forwarded clock. A clock signal is transmitted with each signal path and the forwarded clock signal is sampled at the processor clock frequency to locate rising and falling edges of the clock signal. In FIG. 3, there are two signal paths, so there are two forwarded clock signals FCLK_0 and FCLK_1. The transmit processor sends the data and clock simultaneously such that both leave the processor aligned on edges. Data is transmitted on both rising and falling edges of the clock signals. The recovery circuit is configured to recover the data using the clock with which it coincides. Thus, FDATA_0 is recovered using the FCLK_0 clock signal and FDATA_1 is recovered using FCLK_1. The clock frequency of the forwarded clock FCLK is preferably asynchronous relative to the global processor clock frequency GCLK.

The recovery circuit 270 preferably includes a delay locked loop ("DLL") circuit 300 for each forwarded clock signal. A DLL is a circuit configured to create a copy of a signal with a fixed phase delay. In the preferred embodiment, a DLL 300 is coupled to the forwarded clocks, FCLK_0 and FCLK_1, and generates a clock signal identical in form to these forwarded clocks, but delayed by 90 degrees. These delayed clock signals are preferably called FCLK90_0 and FCLK90_1, respectively. Since data is transmitted on both rising and falling edges, the center of the data window, or data eye, occurs at a 90 degree shift from the data signal. The center of a data signal that is sent only on rising or only on falling edges of a clock signal occurs at a 180 degree shift from the data signal. The clock signal generated by the DLL shifts and holds the clock edge at the center of the data eye which permits proper sampling of the incoming data. The DLL prevents any misalignment of the clock relative to the data that may be caused by low-frequency jitter or variation in circuit propagation delays. The use of DLL circuits is a well known concept that is understood by those skilled in the art.

The data recovery circuit 270 also preferably includes capture latches 330, 340 for each data signal path. Two latches are used: one to capture rising edge data 330 and one to capture falling edge data 340. The data rate in the preferred embodiment is high enough that data cannot be captured in the processor clock domain before the data corresponding to the following clock edge would overwrite the data. The preferred embodiment therefore implements a capture latch for rising edge data 330 and a capture latch for falling edge data 340. With this configuration, the data has a full period of the forwarded clock signal to be sampled into the processor clock domain.

Figure 4:
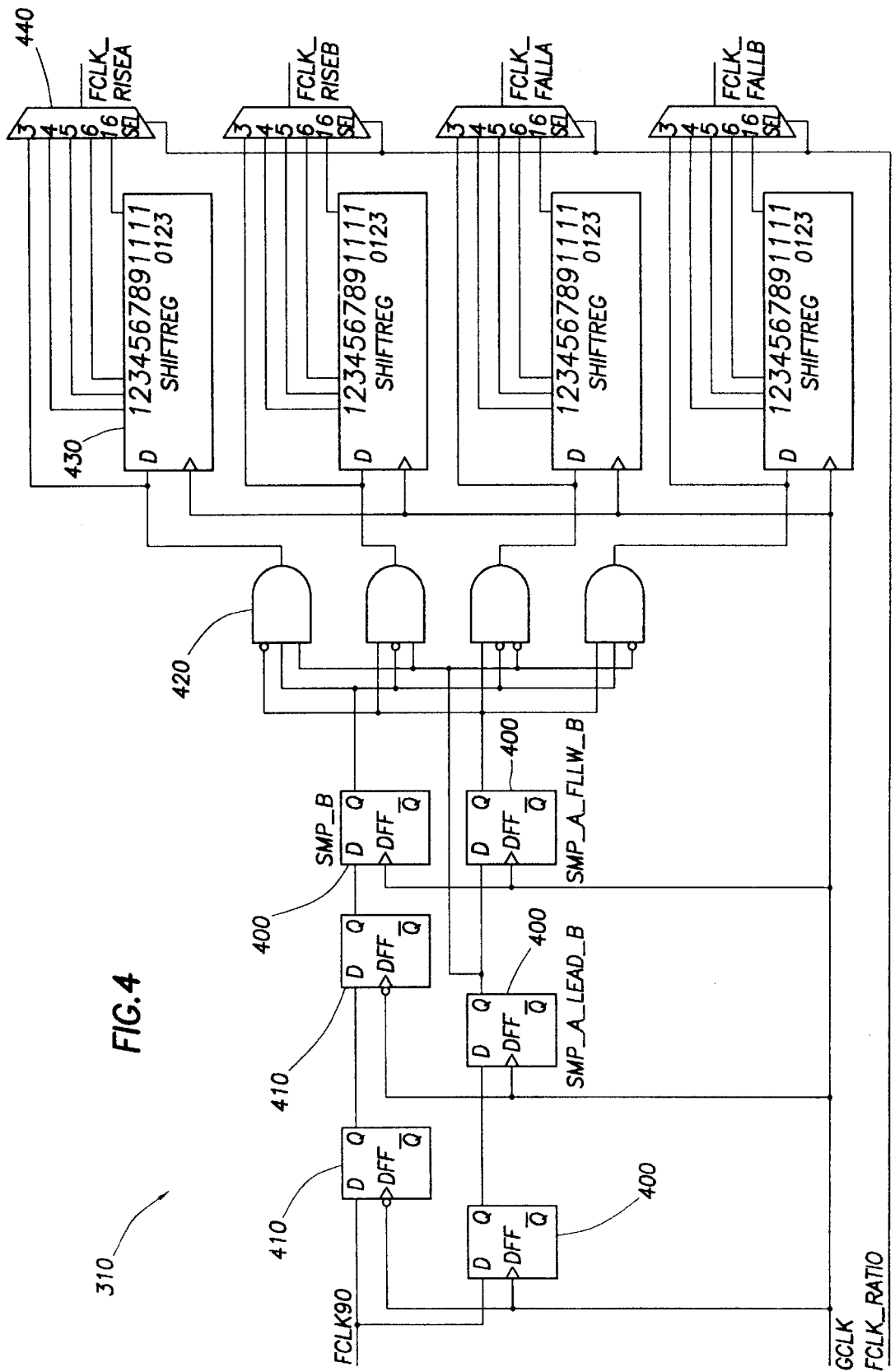
FIG. 4 shows sampling logic used to locate and align data from each sub-packet with rising and falling edges of the clock signals.

A sampling circuit 310 is also included for each forwarded clock in the preferred embodiment. A sampling circuit 310 samples the delayed clock signal FCLK90_0 or FCLK90_1 at the global processor clock rate ("GCLK") to determine when a clock edge appears. The output of the sampling circuit 310 is a bundle of signals that signify where the forward clock edges appear relative to the processor clock GCLK. Other functionality of the sampling circuit 310 is shown in FIG. 4 and is discussed below.

Figure 5:
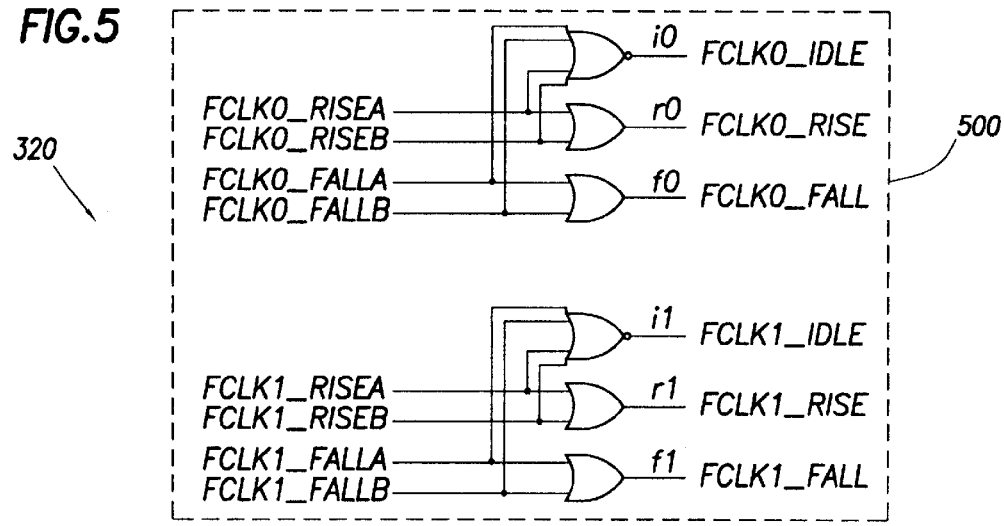
FIG. 5 shows a state diagram and input logic used to indicate when common rising or falling edges of the incoming clocks have been found.
Figure 5:
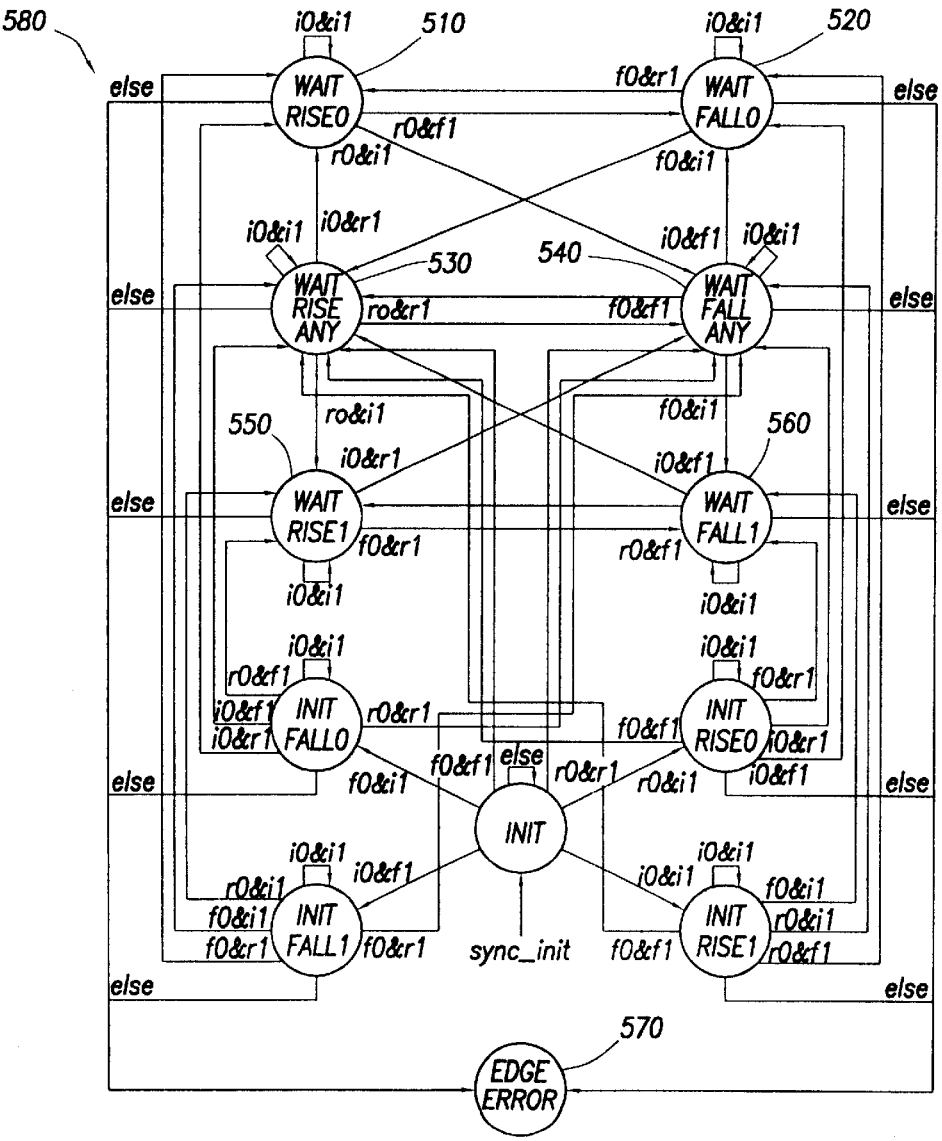
Figure 6A:
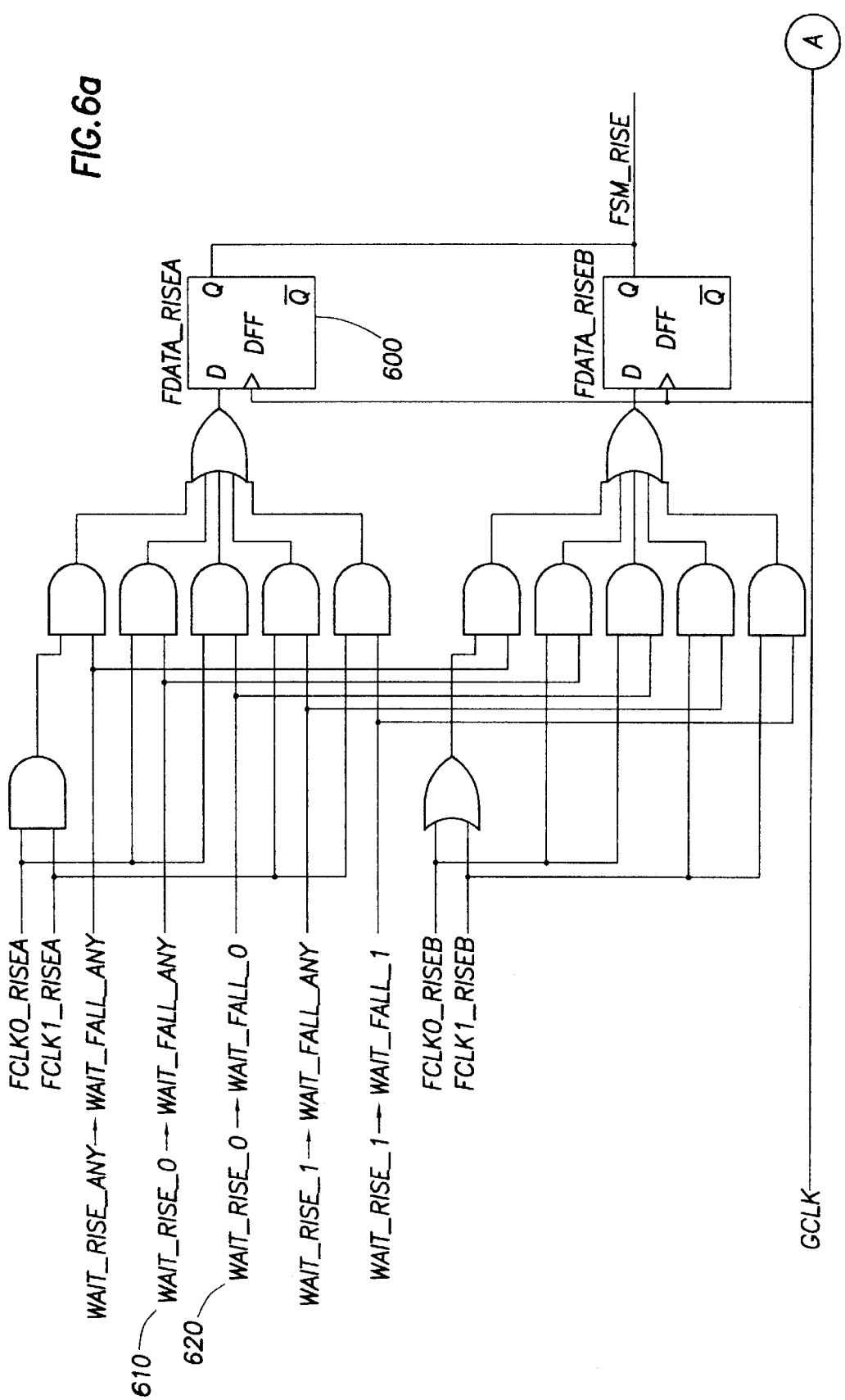
FIG. 6 shows the logic circuitry used to generate signals indicating when data is valid for sampling into the processor clock domain.
Figure 6B:
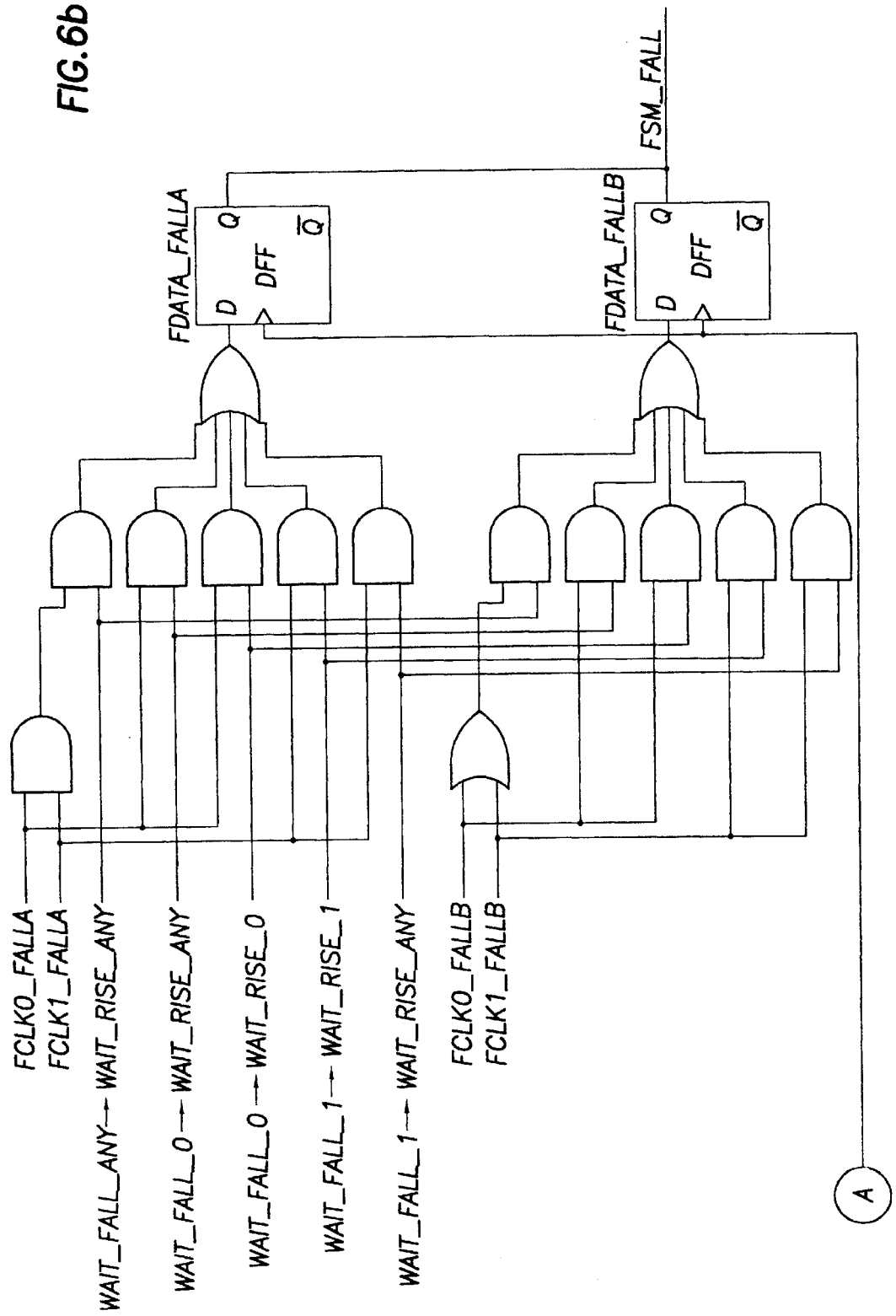

After the locations of the rising and falling edges of the forwarded clocks are known relative to the processor clock GCLK, the problem still remains of how to recombine and realign the data sub-packets that were sent with the different forward clocks, FCLK_0 and FCLK_1. The lengths that these clock and data signals travel may induce skew in the signals resulting in one sub-packet arriving before the other. In the preferred embodiment, a finite state machine and associated logic 320 is used to determine when the data is available from each sub-packet. The finite state machine 320 tracks the sample information generated by the sampling circuit 310 and generates one of two pulses indicating either that rising edges have been detected in both clock signals or falling edges have been detected in both clock signals. These signals are pulses that are one GCLK period in width and are used to indicate when the data in capture latches 330, 340 is safe to be sampled. Further details of the finite state machine 320 are shown in FIGS. 5 and 6 and are discussed below.

As discussed above, two capture latches 330, 340 are used to sample incoming data. One latch 330 is used to capture rising edge data and the other 340 is used to capture falling edge data. A selection multiplexer ("MUX") 360 is used to select between the output of these two capture latches. The control signal for this MUX 360 comes from a set-reset flip-flop 350 or some other suitable selection logic that differentiates between the rise and fall pulses coming from the finite state machine 320. If a rising edge pulse is output from the finite state machine 320, the set-reset flip-flop 350 and selection MUX 360 are configured to send the output from the rising edge capture latch 330 to a recovery latch 370. Conversely, if a falling edge pulse is output from the finite state machine 320, the set-reset flip-flop 350 and selection MUX 360 are configured to send the output from the falling edge capture latch 340 to the recovery latch 370. The recovery latch 370 is a flip-flop driven by the processor clock GCLK and is enabled only when an edge pulse (either rising or falling) is output by the finite state machine. Each time an edge pulse is output by the finite state machine 320, the recovery latches 370 pull data into the processor clock domain. The successfully synchronized, recombined and realigned data bits DATA_0 and DATA_1 are now successfully within the processor clock domain and form the same data packet that was sent by the transmitting processor.

The schematic representation shown in FIG. 3 is an embodiment configured to recover a data packet comprising two bits (DATA_0 and DATA_1). This general embodiment is readily extended to data packets of varying sizes. In the preferred embodiment, there are 32 signal paths used to transmit data signals from one processor to the other. An additional seven error correction code bits may preferably be added to the data packet, which increases the number of data paths to 39. As such, capture latches 330, 340, selection multiplexers 360 and recovery latches 370 are preferably used for each of the 39 signal paths. The DLL 300, sampling circuit 310, and finite state machine circuit 320 shown in FIG. 3 only sample the forwarded clock signals FCLK_0 and FCLK_1. Thus, the preferred embodiment requires only one DLL 300 and one sampling circuit 310 for each forwarded clock signal, regardless of the number of data paths. The preferred embodiment requires a single finite state machine 320 to generate the signal indicating when it is safe to pull the sampled data into the processor clock domain. It should be appreciated that while the preferred embodiment provides a means of recovering data packets that have been separated into two sub-packets, the teachings herein may be applied to circuitry designed to recover multiple sub-packets from multiple transmission paths.

Additionally, the forwarded clock signal FCLK has been represented as single data path. This clock signal may preferably be transmitted as a differential pair of signal conductors. The use of differential pairs for clock transmission may advantageously reduce signal noise and aid in sampling accuracy. The concept of differential pair clock transmission is widely used and known by those skilled in the art. The preferred embodiment may therefore have 43 total signal traces between processors (32 data, 7 error correction, 4 clock). As discussed, however, the embodiment shown in FIG. 3 may readily be extended to any number of signal paths.

The preferred embodiment of the sampling circuit 310 (from FIG. 3) is shown in greater detail in FIG. 4. The logic circuit in FIG. 4 includes a chain of flip-flops 400, 410, a bank of AND gates 420, a bank of shift registers 430, and a bank of multiplexers 440. The chain of flip-flops 400, 410 are included for several reasons. The primary purpose of the flip-flops 400, 410 is to sample the incoming FCLK_90 signal to locate rising and falling edges in the forwarded clock signal. A secondary, but no less important, feature of the flip-flop chain is to prevent a condition known as metastability.

Metastability is a condition that may result from sampling asynchronous digital signals using flip-flops and other logic devices. When a signal is latched using a flip-flop, the input signal must be stable and have a known value with a minimum setup and hold time before the data changes at the subsequent clock edge. If this setup and hold time is violated, the sampled signal becomes unstable and unreliable. The setup time is the amount of time before a clock edge that the data at the flip-flop input must be stable. Conversely, the hold time is the amount of time after the clock edge that the data at the flip-flop input must be stable. The problem of metastability is alleviated by running the input signal through a chain of flip-flops. The problem of metastability and the use of chains of flip-flops to sample digital signals are well known to those skilled in the art. The problem of metastability is discussed in Cypress Semiconductor Corporation application note "Are Your PLDs Metastable?" which is herein incorporated by reference.

The chain of flip-flops 400, 410 shown in FIG. 4 are configured to probabilistically eliminate the chance of metastability while generating samples of the incoming FCLK_90 signal at the GCLK clock frequency. Flip-flops are included that sample FCLK_90 at the rising edge of GCLK 400 and at the falling edge of GCLK 410. The rising edge flip-flops 400 and falling edge flip-flops 410 generate a string of three adjacent samples of the incoming clock FCLK_90. This string of three samples preferably includes a falling edge sample and two rising edge samples (on either side of the falling edge sample). The falling edge sample is called SMP_B. The rising edge samples are called SMP_A_LEAD_B and SMP_A_FLLW_B. To indicate when rising and falling clock edges of the input clock FCLK_90 are located, signals are generated by a bank of AND gates 420 when an edge is found. If a rising edge is found in three adjacent samples, the edge may occur between samples 1 and 2 (011) or between samples 2 and 3 (001). Similarly, if a falling edge is found in three adjacent samples, the edge may occur between samples 1 and 2 1(100) or between samples 2 and 3 (110). Each one of these four conditions is sufficient to trigger one of the AND gates 420 and generate a pulse leading to one of the shift registers 430. The four output signals of the sampling circuit 310 may be referred to as a FALL/RISE BUNDLE. A bundle is generated for each forwarded clock signal FCLK0_90 and FCLK1_90. It should be noted that the chain of flip-flops 400, 410 and bank of AND gates 420 may be configured to generate at sequence of samples including two falling edge samples and one rising edge samples in contrast to the preferred embodiment above. Either embodiment is sufficient for locating the rising and falling edges of a forwarded clock FCLK_90.

One side effect of using a chain of flip-flops 400, 410 to sample the incoming clock is that additional delays are introduced from the time the sampled FCLK_90 signal enters the chain to the time the desired samples exit the chain. In the preferred embodiment, the sample chains introduce a delay of approximately six GCLK periods. This means that the data coinciding with a clock edge that enters the sampling chain is overwritten by the time that clock edge is sampled, located and the data is regarded as sufficiently safe to read. One solution to this problem is to buffer the data, but this introduces latency in waiting for the data to exit the buffer so it can be read. The preferred embodiment incorporates another solution to the problem that takes advantage of the periodic nature of the forwarded clock signal FCLK_90. Since the clock frequencies for the forwarded clock FCLK_90 and the processor clock GCLK are known, it is possible to align data samples coinciding with an FCLK_90 edge in the past to a future FCLK_90 edge. This is accomplished via a bank of shift registers 430 and multiplexers 440. The preferred embodiment also minimizes latency delays in the recovery of the transmitted data.

The pulses that are generated by the AND gates 420 are shifted through the registers 430 one processor clock GCLK at a time. The multiplexers 440 are configured to extract the data from the appropriate location in the shift register at the appropriate time. Given knowledge of the number of flip-flops 400, 410 in the sampling chain and the frequency of the forwarded clock and processor clock, a clock ratio or frequency divisor may be determined and sent to the multiplexers 440 to extract the data at the correct time. In the preferred embodiment, the sampled data may coincide with forwarded clock edges as much as three forwarded clock periods in the past. The preferred embodiment operates on the assumption that the FCLK_90 and GCLK clocks drift only slightly with respect to each other. The drift between the two frequencies should preferably be limited to one GCLK period over 20 FCLK_90 periods. As discussed above, the processor clock frequency must be at least three times as fast as the forwarded clock frequency. This ratio need not be a fixed value and need not be precisely a 3:1 ratio. The processor clock frequency may be slightly slower than three times the forwarded clock frequency. The ratio between the two clock frequencies should preferably be a simple ratio and the drift between these frequencies should be limited as discussed, but the ratio may vary.

The clock ratio FCLK_RATIO settings that determine when the multiplexers 440 extract the edge pulses from the shift registers 430 may be a hard coded variable or may be a boot level setting. This value may also be a dynamic variable that is updated based on instantaneous clock frequencies. In any event, this value is preferably adjustable to account for system variances.

FIG. 5 shows the finite state machine 320 (from FIG. 3) and its associated logic. The FALL/RISE BUNDLE from the sampling circuit 310 are input to logic 500 which classifies the current state of the forwarded clocks as FALL (F0 or F1), RISE (R0 or R1), or IDLE (I0 or I1). In the idle state, neither a rising edge nor a falling edge is detected. The finite state machine 320, then uses these current states to locate common rising or falling edges in both clock signals. The state diagram 580 for the state machine 320 is also depicted in detail in FIG. 5.

The state diagram 580 includes 12 states. During normal operation of the finite state machine 320, only the upper six states 510–560 are used. Five of the remaining six states are used during startup and initialization of the state machine. The last state, the EDGE ERROR state 570, is a fault state that is used only in the event sub-packets do not appear to be correlated or in the event the two forwarded clock signals (FCLK0_90 and FCLK1_0 in FIG. 3) are completely out of phase (180 degrees) with each other. The finite state machine 320 will properly locate common clock edges in the sub-packets as long as the skew between the forwarded clock signals is limited to one phase of the transmit clock FCLK_90 minus one phase of the internal clock GCLK.

The upper six states 510–560 of the state diagram 580 shown in FIG. 5 establish which type of edge has been detected, which type of edge is expected, and from which forwarded clock signal an edge has been detected and is expected. For instance, the WAIT RISE0 state 510 is entered if a rising edge has been detected in the forwarded clock signal FCLK1_90 but not in FCLK0_90. The corresponding rising edge from FCLK0_90 is therefore expected. At the next GCLK clock cycle, the FALL/RISE BUNDLE of both forwarded clock signals are input to the logic 500 which outputs the current state of the forwarded clock signals. In the WAIT RISE0 state 510, if no edge is found in FCLK0_90 on the next clock cycle (i.e., an O0 results), the current state remains the same. If a rising edge is found (i.e., an R0 results), the current state changes depending on the status of the FCLK1_90 signal. If the rising edge in FCLK0_90 (R0) coincides with an idle state for FCLK_90 (I0), the current state becomes WAIT FALL ANY 540. This logically implies that the state machine begins looking for a falling edge in either FCLK0_90 or FCLK1_90. If the rising edge in FCLK0_90 (R0) coincides with a falling edge in FCLK1_90 (F0), the current state becomes WAIT FALL0 520, which implies that the state machine will then search for a falling edge in FCLK0_90. It should be noted that if the current state is WAIT RISE0 510 and a falling edge is found in FCLK1_90 (F1) before a rising edge is found in FCLK0_90 (R0), the clocks are more than 180 degrees out of phase and an EDGE ERROR 570 will result. The remaining upper five states in the state diagram 520–560 operate in the same manner as the WAIT RISE0 state 510 and account for all the combinations of rising and falling edge sequences that may occur in FCLK0_90 and FCLK1_90.

In conjunction with the input logic 500 and state diagram 580, the state machine 320 also includes output logic that generates pulses indicating when the data is safe to be pulled into the processor clock domain. This output logic is shown in FIG. 6. The inputs to this logic are the FALL/RISE BUNDLE for both forwarded clocks and impulses created by state transitions in the state diagram 580. The inputs are grouped by rise and fall transitions with rise transitions grouped on the left side of FIG. 6 and fall transitions grouped on the right side of FIG. 6. The output logic is configured so that when a state transition occurs between one of the upper six states 510–560 of the state diagram 580, a pulse will be generated at one of the four output latches 600 and clocked at the next processor clock ("GCLK") cycle. For instance, if the current state is the WAIT RISE0 state and on the next GCLK clock cycle, the FALL/RISE BUNDLE indicates that a FCLK0_RISEA type of edge has been found, then an R0 will be generated at the input logic 500 of the finite state machine 320. Since the state machine was waiting for an R0 signal and assuming the current state of the FCLK1_90 clock is either idle ("I1") or falling ("F1"), then the current state will transition from WAIT RISE0 to WAIT FALL ANY OR WAIT FALL0. This state transition will generate a pulse at input 610 (WAIT RISE0 to WAIT FALL ANY transition) if forwarded clock FCLK1_90 is idle ("I1") or input 620 (WAIT RISE0 to WAIT FALL 0 transition) if FCLK1_90 is falling ("F1"). The combination of pulses at either of these inputs and the FCLK0_RISEA input are sufficient to generate a pulse at the input to the FDATA_RISEA latch 600. This will, in turn generate a pulse at the FSM_RISE output indicating both rising edges have been found. The remaining rise transition logic operates in the same manner and will generate a pulse at the FSM_RISE output when rising edges have been located in both data sub-branches. Similarly, if both falling edges have been found, a pulse is generated at the FSM_FALL output. Both signals appear as a pulse that is one GCLK period wide and indicate when it is safe to pull data into the processor clock domain. As discussed above, these outputs also drive logic and multiplexers that pull data from the appropriate rising or falling capture latches 330, 340.

The above discussion is meant to be illustrative of the principles and various embodiments of the present invention. Numerous variations and modifications will become apparent to those skilled in the art once the above disclosure is fully appreciated. For example, the teachings herein may be extended to a system where data has been split into three transmission sub-packets. A third forwarded clock signal would be sent with the third sub-packet and additional logic and states in the state machine would be required. It is intended that the following claims be interpreted to embrace all such variations and modifications.

What is claimed is:

1. A multiprocessor system, comprising:
    a communications link between processors configured to transmit data packets from a transmitting processor to a receiving processor wherein the communications link comprises a conduction path for each data bit in the data packet;
    at least one input/output device coupled to at least one processor;
    wherein the conduction paths are grouped into separate bundles and routed along different paths and a forwarded clock signal is sent with each bundle wherein at the receiving processor, the data in the separate bundles is recombined to recreate the data packet; and
    wherein the processors operate with a clock frequency that is approximately three times as fast as the clock frequency of the forwarded clock signal and data is transmitted on both rising and falling edges of the forwarded clock signal.

2. The computer system of claim 1 wherein the receiving processor further comprises:
    a recovery circuit to sample the forwarded clock signals and locate corresponding clock edges in the separate forwarded clock signals to indicate when the data on the conduction paths may pulled into the processor clock domain.

3. The computer system of claim 2 wherein the recovery circuit comprises:
    a delay locked loop circuit coupled to each forwarded clock signal to create a delayed copy of the forwarded clock signal wherein the clock edges in the delayed clock signal are aligned with the center of the data window for data transmitted with the forwarded clock signal;
    a sampling circuit coupled to each delayed clock signal and configured to sample the delayed clock signal at the processor clock frequency to locate rising and falling edges in the delayed clock signal;
    a finite state machine coupled to the sampling circuit for each delayed clock signal configured to identify when corresponding rising or falling edges have been sampled for each delayed clock signal; and
    data capture logic configured to sample and hold the data bits on each conduction path in the communications link and, when the finite state machine issues a command indicating that all falling or rising edges have been found, deliver the data as a complete packet to the processor clock domain at the subsequent processor clock edge.

4. The computer system of claim 3 wherein the sampling circuit comprises:
    a chain of flip-flops configured to sample the delayed clock signal and generate a string of sequential samples of the clock signal;
    a bank of logic gates configured to set a bit at the output of one of the logic gates indicating that an edge transition occurs between any of the sequential samples;
    a shift register coupled to each logic gate configured to shift the output of the associated logic gate at every processor clock cycle; and
    a multiplexer coupled to each shift register configured to extract data from a bit location in the shift register as specified by a clock ratio input;
    wherein the clock ratio is based on the ratio of the transmission and processor clock frequencies and also on the length of the flip-flop chain through which the clock signals are sampled.

5. The computer system of claim 3 wherein the finite state machine comprises:
    input logic coupled to the outputs of each sampling circuit configured to indicate if the sampling circuit has detected a rising edge, a falling edge, or no edge in the delayed clock signal;
    a state machine with a plurality of states coupled to the input logic, each state reserved for a condition where edges of a certain type and from a certain source are expected;

output logic configured to receive signals from the input logic and from the state machine; and wherein transitions between states in the state machine occur when expected edge types are found and generate a pulse that is sent to the output logic; and wherein if the signals to the output logic are sufficient to indicate that expected rising edges have been found from all delayed clocks, a rise command is output and wherein if the signals to the output logic are sufficient to indicate that expected falling edges have been found from all delayed clocks, a fall command is output.

6. The computer system of claim 5 wherein the data capture logic comprises:

rising capture latches operating at the delayed clock frequency configured to sample data from each conduction path on rising edges of the delayed clock signal;

falling capture latches operating at the delayed clock frequency configured to sample data from each conduction path on falling edges of the delayed clock signal;

a multiplexer configured to select between the output of the rising and falling capture latches;

selection logic configured to detect the rise and fall commands from the finite state machine; and a recovery latch operating at the processor clock frequency coupled to the output of each multiplexer that is enabled only when a rise or a fall command is issued by the finite state machine;

wherein when the finite state machine issues a rise command, the selection logic delivers a signal to the multiplexer to select data that is sampled by the rising capture latch and wherein when the finite state machine issues a fall command, the selection logic delivers a signal to the multiplexer to select data that is sampled by the falling capture latch.

7. The computer system of claim 1 wherein:

the forwarded clock signal is transmitted on a differential pair of conduction paths.

8. An inter-processor communications link, comprising conduction paths for each bit in a binary data packet transmitted between processors and conduction paths for at least two forwarded clock signals wherein:

conduction paths are grouped into separate bundles and routed along different paths and a forwarded clock signal is sent with each bundle on a differential pair of conductors;

at the receiving processor, the data in the separate bundles is recombined to recreate the data packet; and wherein the processor operates with a clock frequency that is approximately three times as fast as the clock frequency of the forwarded clock signal and data is transmitted on both rising and falling edges of the forwarded clock signal.

9. The communications link of claim 8 wherein the receiving processor further comprises:

a recovery circuit to sample the forwarded clock signals to locate corresponding clock edges in each of the forwarded clock signals to indicate when the data on the conduction paths may be sampled into the processor clock domain.

10. The communications link of claim 9 wherein the recovery circuit comprises:

a DLL circuit coupled to and configured to create a copy of each forwarded clock signals that is delayed by 90 degrees;

a sampling circuit coupled to and configured to sample the delayed clock signal at the processor clock frequency to locate rising and falling edges in the delayed clock signal;

a finite state machine coupled to all sampling circuits and configured to identify when corresponding rising or falling edges have been sampled for each delayed clock signal; and data recovery logic configured to sample and hold the data bits on each conduction path in the communications link and latch all bits of the data packet to the processor clock domain at the subsequent processor clock edge when the finite state machine issues a command indicating that all falling or rising edges have been found.

11. The communications link of claim 10 wherein the sampling circuit comprises:

a chain of flip-flops configured to sample the delayed clock signal and generate a string of three sequential samples of the clock signal;

a bank of four logic gates configured to set a bit at the output of one of the logic gates indicating that an edge transition occurs between any two of the three sequential samples;

a shift register coupled to each logic gate configured to shift the output of the associated logic gate through the register at every processor clock cycle; and a multiplexer coupled to each shift register configured to extract data from a bit location in the shift register as specified by a clock ratio input;

wherein the clock ratio is based on the ratio of the transmission and processor clock frequencies and also on the length of the flip-flop chain through which the clock signals are sampled.

12. The communications link of claim 10 wherein the finite state machine comprises:

a plurality of states, each state reserved for one of a number of conditions where edges of a certain type and from a certain delayed clock signal are expected; and wherein transitions between states in the state machine occur when expected edge types are found; and if the expected rising edges have been found from all delayed clocks, a rise command is output and if the expected falling edges have been found from all delayed clocks, a fall command is output; and if unexpected falling or rising edges are detected indicating the delayed clocks are more than half a period out of phase, an error command is generated.

13. The communications link of claim 12 wherein the data recovery logic comprises:

rising and falling capture latches operating at the delayed clock frequency configured to sample data from each conduction path on rising and falling edges of the delayed clock signal, respectively;

a multiplexer configured to select between the output of the rising and falling capture latches;

a set-reset flip-flop configured to detect the rise and fall commands from the finite state machine; and a recovery latch operating at the processor clock frequency coupled to the output of each multiplexer that is enabled only when a rise or a fall command is issued by the finite state machine;

wherein when the finite state machine issues a rise command, the set-reset flip-flop delivers a signal to the multiplexer to select data that is sampled by the rising capture latch and wherein when the finite state machine issues a fall command, the set-reset flip-flop delivers a signal to the multiplexer to select data that is sampled by the falling capture latch.

14. A method of transmitting data packets between processors, comprising:

sending each bit in the packet on a dedicated conduction path;

separating the conduction paths into at least two separate bundles and routing the bundles along different paths;

sending a clock signal with each bundle and transmitting data on the conduction paths aligned on both rising and falling edges of the clock signal;

delaying the clock signal by one fourth of one period and sampling the delayed clock signals to locate rising and falling edges;

wherein when rising edges have been found in each clock signal, extracting the data corresponding to that rising clock edge and wherein when falling edges have been found in each clock signal, extracting the data corresponding to that falling clock edge.

15. The method of claim 14, further comprising:

transmitting each of the forwarded clock signals on a differential pair conduction path.

16. The method of claim 14, further comprising:

sampling the delayed clock signals with a chain of flip-flops to avoid metastability problems;

using the chain of flip-flops to generate a string of sequential samples of the delayed clock signal and generating an output pulse at one of a bank of logic gates if an edge transition is located within the string of samples.

17. The method of claim 16, further comprising:

accounting for the delay caused in sampling the delayed clock signals by using a shift register to shift the logic pulses through the register and extracting the pulse signals from the appropriate location in the shift register to align data bits with past delayed clock edges.

18. The method of claim 17, further comprising:

using a state machine to track which edges have been detected by the sampling circuit;

generating a rise signal when rising edges have been detected in each forwarded clock signal;

generating a fall signal when falling edges have been detected in each forwarded clock signal; and generating an error signal if the forwarded clocks are more than one period out of phase with forwarded clocks from other bundles.

19. The method of claim 17, further comprising:

transmitting the data and forwarded clocks at a frequency that is at least one third the speed of the processor clock speed; and oversampling the forwarded clocks at the processor clock frequency to locate clock edge transitions.

20. The method of claim 17, further comprising:

using capture latches to hold rising edge and falling edge data;

coupling the capture latches to the input of a multiplexer that is controlled by output signals from the finite state machine;

latching the multiplexer output into the processor clock domain using a flip-flop that is enabled only when the finite state machine indicates that common edges have been detected in all delayed clocks.

* * * * *